(12) United States Patent
Wu (10) Patent No.: US 12,057,699 B1
(45) Date of Patent: Aug. 6, 2024

(54) POWER DISTRIBUTION UNIT

(71) Applicant: SUZHOU METABRAIN INTELLIGENT TECHNOLOGY CO., LTD., Jiangsu (CN)

(72) Inventor: Mingwei Wu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/570,630

(22) PCT Filed: Jun. 7, 2022

(86) PCT No.: PCT/CN2022/097427
§ 371 (c)(1),
(2) Date: Dec. 14, 2023

(87) PCT Pub. No.: WO2023/115835
PCT Pub. Date: Jun. 29, 2023

(30) Foreign Application Priority Data

Dec. 24, 2021 (CN) .......................... 202111593762.3

(51) Int. Cl.
*H02J 3/18* (2006.01)
(52) U.S. Cl.
CPC ..................................... *H02J 3/18* (2013.01)
(58) Field of Classification Search
None
See application file for complete search history.

(56) References Cited

U.S. PATENT DOCUMENTS

2016/0164291 A1* 6/2016 Rosendahl ............. G05B 15/02
          700/295
2019/0355506 A1* 11/2019 Fei ....................... H01F 27/2804

FOREIGN PATENT DOCUMENTS

| CN | 200990560 Y | 12/2007 |
| CN | 102246376 A | 11/2011 |
| CN | 109983645 A | 7/2019 |
| CN | 209462287 U | 10/2019 |
| CN | 110995065 A | 4/2020 |
| CN | 114024313 A | 2/2022 |

* cited by examiner

*Primary Examiner* — Jared Fureman
*Assistant Examiner* — Aqeel H Bukhari
(74) *Attorney, Agent, or Firm* — IPro, PLLC (57) ABSTRACT

The present application discloses a power distribution unit (PDU), including three monophase sockets, a star-connected switching circuit, a delta-connected switching circuit and a controller. The controller is configured to correspondingly control the star-connected switching circuit or the delta-connected switching circuit to be turned on according to a current three-phase power wiring requirement of the power distribution unit, so that three phase windings on a secondary side of a distribution transformer are connected according to a target wiring mode conforming to the three-phase power wiring requirement, and three phase power under the target wiring mode is supplied to the three monophase sockets respectively. The PDU of the present disclosure simultaneously supports a delta wiring mode and a star wiring mode, and automatically selects a corresponding wiring mode according to the current three-phase power wiring requirement of the PDU.

20 Claims, 7 Drawing Sheets

POWER DISTRIBUTION UNIT

CROSS-REFERENCE TO RELATED APPLICATIONS

The present application claims priority to Chinese patent application No. 202111593762.3 entitled "POWER DISTRIBUTION UNIT", filed on Dec. 24, 2021 before the China National Intellectual Property Administration, which is incorporated herein in its entirety by reference.

TECHNICAL FIELD

The present application relates to the technical field of data centers and, in particular to a power distribution unit.

BACKGROUND

Figure 1:
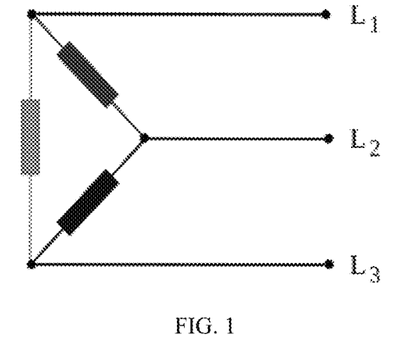
FIG. 1 is a schematic structural diagram illustrating a delta connection in the related art.
Figure 2:
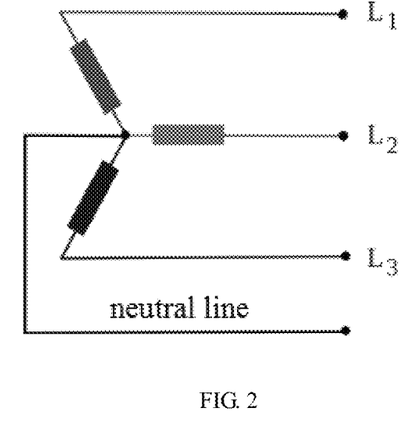
FIG. 2 is a schematic structural diagram illustrating a star connection in the related art.

Currently, data centers are generally powered by three-phase sources. Wiring modes of three-phase power include a delta connection (A) and a star connection (Y). A delta connection is shown in FIG. 1. As shown in FIG. 1, in the delta connection, the power sources or loads of different phases are sequentially connected end to end to form a delta ring. A star connection is shown in FIG. 2. As shown in FIG. 2, in the star connection, one end of the power sources or loads of different phases is connected together at a point, thereby forming a neutral point, and such connection is also referred to as a three-phase three-wire system; if a neutral line extending from the neutral point is introduced, the entire structure becomes a three-phase four-wire system. There is merely one kind of voltage in the delta connection since various phases are connected end to end, while different voltages are allowed to be applied on various phases in the star connection.

SUMMARY

The present disclosure provides a power distribution unit, including:
  three monophase sockets, among the three monophase sockets, any target monophase socket is configured to be connected with an electrical apparatus conforming to voltage of the target monophase socket;
  a star-connected switching circuit connected with three phase windings on a secondary side of a distribution transformer and the three monophase sockets;
  a delta-connected switching circuit connected with the three phase windings and the three monophase sockets; and
  a controller that is connected with the star-connected switching circuit and the delta-connected switching circuit, and configured to correspondingly control the star-connected switching circuit or the delta-connected switching circuit to be turned on according to a current three-phase power wiring requirement of the power distribution unit, so that the three phase windings are connected according to a target wiring mode conforming to the three-phase power wiring requirement, and three phase power under the target wiring mode is supplied to the three monophase sockets respectively.

In one or more embodiments, the three phase windings include an a-phase winding, a b-phase winding and a c-phase winding; the three monophase sockets include an a-phase socket, a b-phase socket and a c-phase socket; the star-connected switching circuit includes a first star switch, a second star switch, a third star switch, a fourth star switch, a fifth star switch and a sixth star switch;
  a first terminal of the first star switch is connected with a first terminal of the a-phase winding, a second terminal of the a-phase winding is connected with a live wire terminal of the a-phase socket, a first terminal of the second star switch is connected with a first terminal of the b-phase winding, a second terminal of the b-phase winding is connected with the live wire terminal of the b-phase socket, a first terminal of the third star switch is connected with a first terminal of the c-phase winding, a second terminal of the c-phase winding is connected with the live wire terminal of the c-phase socket, a first terminal of the fourth star switch is connected with a neutral wire terminal of the a-phase socket, a first terminal of the fifth star switch is connected with the neutral wire terminal of the b-phase winding, a first terminal of the sixth star switch is connected with the neutral wire terminal of the c-phase socket, second terminals of the first star switch to the sixth star switch are connected, and control terminals of the first star switch to the sixth star switch are all connected with the controller, and earth wire terminals of the a-phase socket, the b-phase socket and the c-phase socket are all grounded;
  the controller is further configured to, when the current three-phase power wiring requirement of the power distribution unit is a star connection requirement, control all the six star switches in the star-connected switching circuit to be turned on.

In one or more embodiments, the three phase windings include an a-phase winding, a b-phase winding and a c-phase winding; the three monophase sockets include an a-phase socket, a b-phase socket and a c-phase socket; the delta-connected switching circuit includes a first delta switch, a second delta switch, a third delta switch, a fourth delta switch, a fifth delta switch and a sixth delta switch;
  a first terminal of the first delta switch is connected with a second terminal of the a-phase winding, a live wire terminal of the a-phase socket and a first terminal of the sixth delta switch, respectively, a second terminal of the first delta switch is connected with a first terminal of the b-phase winding, a first terminal of the second delta switch is connected with a second terminal of the b-phase winding, the live wire terminal of the b-phase socket and a first terminal of the fourth delta switch, respectively, a second terminal of the second delta switch is connected with a first terminal of the c-phase winding, a first terminal of the third delta switch is connected with a second terminal of the c-phase winding, the live wire terminal of the c-phase socket and a first terminal of the fifth delta switch, respectively, a second terminal of the third delta switch is connected with a first terminal of the a-phase winding, a second terminal of the fourth delta switch is connected with a neutral wire terminal of the a-phase socket, a second terminal of the fifth delta switch is connected with the neutral wire terminal of the b-phase socket, a second terminal of the sixth delta switch is connected with the neutral wire terminal of the c-phase socket, and earth wire terminals of the a-phase socket, the b-phase socket and the c-phase socket are all grounded;
  the controller is further configured to, when the current three-phase power wiring requirement of the power distribution unit is a delta connection requirement, control all the six delta switches in the delta-connected switching circuit to be turned on.

In one or more embodiments, the power distribution unit further includes:

a voltage and current detection circuit that is connected with the three phase windings and the three monophase sockets respectively, and is configured to detect an input voltage, an input current, an output voltage and an output current of each phase of the power distribution unit; and a protection switching circuit that is disposed on a connection line between the three phase windings and the three monophase sockets, and connected with the controller;

the controller is further configured to, when an input voltage and/or input current and/or an output voltage and/or output current of any target phase of the power distribution unit do not meet a preset safety standard, control the protection switching circuit to disconnect a target connection line between the winding of the target phase and the socket of the target phase.

In one or more embodiments, the voltage and current detection circuit includes three sub-detection circuits for detecting three monophase power input by the three phase windings respectively and three sub-detection circuits for detecting monophase power output by each of the three monophase sockets respectively, and each of the sub-detection circuits includes:

a current sensing element, configured to detect a current signal of a corresponding target monophase power;

a first differential amplifier that is connected with the current sensing element, and configured to amplify the current signal to obtain an amplified current signal;

a voltage sensing element configured to detect a voltage signal of the target monophase power; and a second differential amplifier that is connected with the voltage sensing element, and configured to amplify the voltage signal to obtain an amplified voltage signal;

the three phase windings include an a-phase winding, a b-phase winding and a c-phase winding; the three monophase sockets comprise an a-phase socket, a b-phase socket and a c-phase socket; and the protection switching circuit includes an a-phase protection switch, a b-phase protection switch and a c-phase protection switch;

a first terminal of the a-phase protection switch is connected with a second terminal of the a-phase winding, a second terminal of the a-phase protection switch is connected with a live wire terminal of the a-phase socket, a first terminal of the b-phase protection switch is connected with a second terminal of the b-phase winding, a second terminal of the b-phase protection switch is connected with the live wire terminal of the b-phase socket, a first terminal of the c-phase protection switch is connected with a second terminal of the c-phase winding, a second terminal of the c-phase protection switch is connected with the live wire terminal of the c-phase socket, and control terminals of the a-phase protection switch, the b-phase protection switch and the c-phase protection switch are all connected with the controller;

the controller is further configured to, when the amplified current signal and/or the amplified voltage signal of a target monophase power do not meet a preset safety standard, control the protection switch corresponding to the target monophase power to be turned off.

In one or more embodiments, the controller is further configured to:

in response to the input voltage of the target phase being continuously greater than a first preset high voltage threshold for more than a first preset time, control the protection switching circuit to disconnect the target connection line;

in response to the input voltage of the target phase being continuously less than a preset low voltage threshold for more than a second preset time, control the protection switching circuit to disconnect the target connection line;

in response to the input current of the target phase being continuously greater than a first preset high current threshold for more than a third preset time, control the protection switching circuit to disconnect the target connection line;

in response to the output voltage of the target phase being continuously greater than a second preset high voltage threshold for more than a fourth preset time, control the protection switching circuit to disconnect the target connection line;

in response to the output current of the target phase being continuously greater than a second preset high current threshold for more than a fifth preset time, control the protection switching circuit to disconnect the target connection line.

In one or more embodiments, the controller is further configured to:

calculate a first phase difference $\theta_1$ between the input voltage and the input current of the target phase, and calculate an input power factor COS $\theta_1$ of the target phase based on the first phase difference;

multiply the input voltage of the target phase with the input current of the target phase and then multiply with the input power factor, and obtain input power consumption of the target phase;

calculate a second phase difference $\theta_2$ between the output voltage and the output current of the target phase, and calculate an output power factor COS $\theta_2$ of the target phase based on the second phase difference; and multiply the output voltage of the target phase with the output current of the target phase and then multiply with the output power factor, and obtain output power consumption of the target phase.

In one or more embodiments, the controller further includes:

a communication interface connected with an external apparatus;

the controller is further configured to communicate data with the external apparatus through the communication interface to complete a corresponding processing function.

In one or more embodiments, the controller further includes:

an expansion interface connected with a display;

the controller is further configured to control the display to display a specified content through the expansion interface.

In one or more embodiments, the communication interface includes:

an Ethernet interface, a remote communication with a master computer is achieved by accessing Ethernet through the Ethernet interface, and the master computer is configured to remotely access the controller through the Ethernet, to acquire relevant control information of the controller;

a Graphical User Interface (GUI) interface connected with a first Personal computer (PC), the first PC is configured to send a user instruction to the controller through the GUI interface, so that the controller performs a corresponding control operation according to the user instruction; and a serial communication interface connected with a second PC, the second PC is configured to upgrade firmware of the controller through the serial communication interface.

The details of one or more embodiments of the present disclosure are illustrated in the following drawings and description. Other features and advantages of the present d will become apparent from the description, the drawings and the claims.

BRIEF DESCRIPTION OF THE DRAWINGS

In order to more clearly illustrate the technical solutions of the embodiments of the present disclosure, the drawings that are required to describe the embodiments or the related art will be briefly described below. Apparently, the figures that are described below are merely some embodiments of the present disclosure, and those skilled in the art may obtain other figures according to these figures without paying creative work.

DETAILED DESCRIPTION

In order to make the objects, technical solutions and advantages of the embodiments of the present disclosure clearer, the technical solutions of the embodiment of the present disclosure will be described clearly and completely with reference to the attached drawings of the embodiments of the present disclosure. Apparently, the described embodiments are a portion of embodiments of the present disclosure, rather than all the embodiments. Based on the embodiments in the present disclosure, all other embodiments obtained by those skilled in the art without creative work belong to the protection scope of the present disclosure.

In the data center, a distribution transformer is generally used in combination with a Power Distribution Unit (PDU) to distribute power to an electrical apparatus in a rack or a cabinet. The distribution transformer is used to transform the three-phase power input from a primary side according to a power distribution requirement of the data center, and input the transformed three-phase power to the PDU through a secondary side. The PDU may be a PDU of a delta connection or a PDU of a star connection, which may be deployed in advance according to the wiring requirements of three-phase power of the data center. The PDU is configured to connect three phase windings on the secondary side of the distribution transformer according to its own wiring mode, and obtain a three-phase power output in the corresponding wiring mode. It may be understood that, the three-phase power output by the PDU is three monophase power, and each monophase power may be used by an electrical apparatus conforming to the voltage of this monophase power. It should be noted that, a single PDU merely supports one wiring mode. Accordingly, if the wiring requirements of the three-phase power of the PDU in the data center change, a PDU with the corresponding wiring needs to be re-deployed. However, the inventor realized that, re-deployment of the PDU needs to change the connection line of the circuit, which is not easy to be realized, resulting in a long deployment time and low deployment efficiency.

Therefore, how to provide a solution to the above technical problems is a problem that those skilled in the art need to solve at present.

Figure 3:
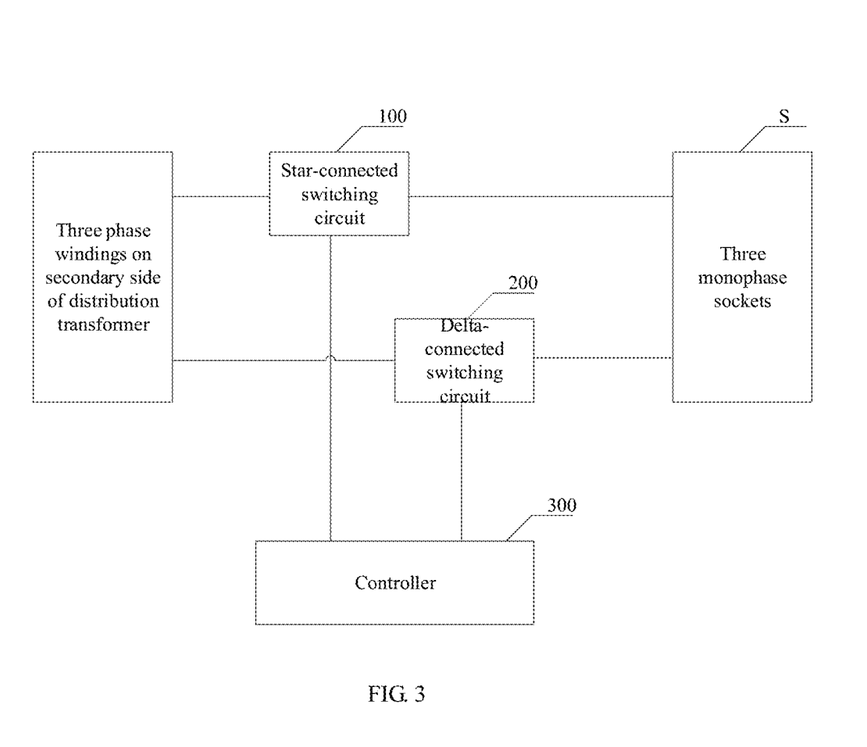
FIG. 3 is a schematic structural diagram illustrating a power distribution unit according to one or more embodiments.

Reference is made to FIG. 3, which is a schematic structural diagram illustrating a power distribution unit provided by an embodiment of the present disclosure.

The power distribution unit includes three monophase sockets S, a star-connected switching circuit 100, a delta-connected switching circuit 200 and a controller 300.

Among the three monophase sockets S, any target monophase socket is configured to be connected with an electrical apparatus conforming to the voltage of the target monophase socket.

The star-connected switching circuit 100 is connected with three phase windings on a secondary side of a distribution transformer and the three monophase sockets.

The delta-connected switching circuit 200 is connected with the three phase windings and the three monophase sockets S.

The controller 300 is connected with both of the star-connected switching circuit 100 and the delta-connected switching circuit 200, and is configured to: control, according to a current three-phase power wiring requirement of the power distribution unit, the star-connected switching circuit 100 or the delta-connected switching circuit 200 to be turned on, so that the three phase windings are connected according to a target wiring mode conforming to the three-phase power wiring requirement, and the three-phase power in the target wiring mode is supplied to the three monophase sockets S respectively.

The power distribution unit of the present disclosure includes three monophase sockets S, the star-connected switching circuit 100, the delta-connected switching circuit 200 and the controller 300, and the working principle thereof is as follows:

The star-connected switching circuit 100 is connected with three phase windings on the secondary side of the distribution transformer and three monophase sockets S, respectively. The delta-connected switching circuit 200 is connected with three phase windings on the secondary side of the distribution transformer and three monophase sockets S, respectively. The controller 300 controls the star-connected switching circuit 100 or the delta-connected switching circuit 200 to be turned on according to the current three-phase power wiring requirement of the power distribution unit, so that the three phase windings on the secondary side of the distribution transformer are connected according to the target wiring mode conforming to the three-phase power wiring requirement, and the three-phase power in the target wiring mode is supplied to the three monophase sockets S respectively, to supply power to the electrical apparatuses connected with the three monophase sockets S.

For example, when the current three-phase power wiring requirement of the power distribution unit requires a star connection, the controller 300 controls the star-connected switching circuit 100 to be turned on, so that three phase windings on the secondary side of the distribution transformer are connected in a star connection mode, and the three-phase power in the star connection mode is supplied to the three monophase sockets S respectively. When the current three-phase power wiring requirement of the power distribution unit requires a delta connection, the controller 300 controls the delta-connected switching circuit 200 to be turned on, so that the three phase windings on the secondary side of the distribution transformer are connected in a delta connection mode, and the three-phase power in the delta connection mode is supplied to the three monophase sockets S respectively.

It should be noted that, the star-connected switching circuit 100 and the delta-connected switching circuit 200 are not turned on at the same time. The advantage of the star connection mode lies in allowing different voltages to be applied on various phases, for example the common 230/400V three-phase alternating current, that is, 230V is applied between the neutral point and any phase, and 400V is applied on the remaining two phases. The advantage of the delta connection mode lies in that even if one of the three phases is out of order, the entire system may still operate (the efficiency is 57.7% of the original efficiency). It should also be noted that, two types of power distribution unit are provided, namely a basic power distribution unit and a smart power distribution unit (Smart PDU). Although both of them are capable to provide reliable power distribution for key apparatuses in the rack or cabinet, the Smart PDU provides more functions, so the Smart PDU is used in the present disclosure for improvement.

Figure 4:
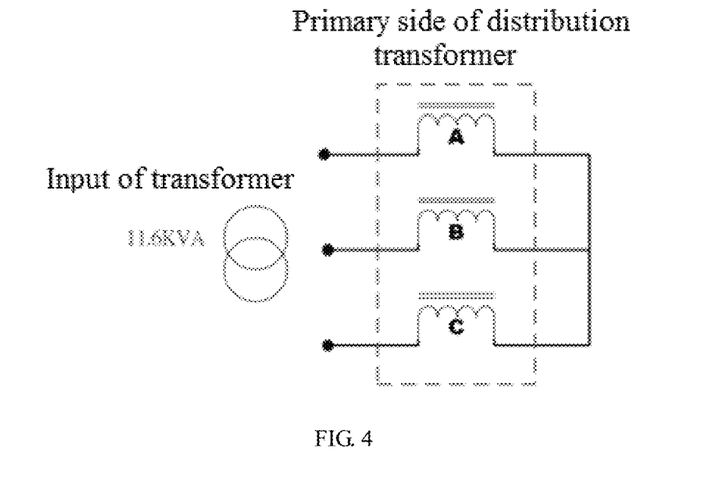
FIG. 4 is a schematic structural diagram illustrating a primary side of a distribution transformer according to one or more embodiments.

In addition, as shown in FIG. 4, the three phase windings on the primary side of the distribution transformer are preferably connected in the star connection mode, which has the following advantages: 1) harmonic current is reduced and the quality of power supply sine wave is improved; 2) the zero-sequence resistance is small, which improves the monophase short-circuit current and is beneficial to the removal of monophase grounding fault; and 3) under the condition of three-phase unbalanced load, the transformer capacity is fully utilized and the transformer loss is reduced.

It may be seen that, the power distribution unit of the present disclosure supports both the delta connection mode and the star connection mode, and is capable to automatically select a corresponding wiring mode according to the current three-phase power wiring requirement of the power distribution unit. Therefore, it is not necessary to redeploy the PDU, thereby saving the deployment time and improving deployment efficiency.

Figure 5:
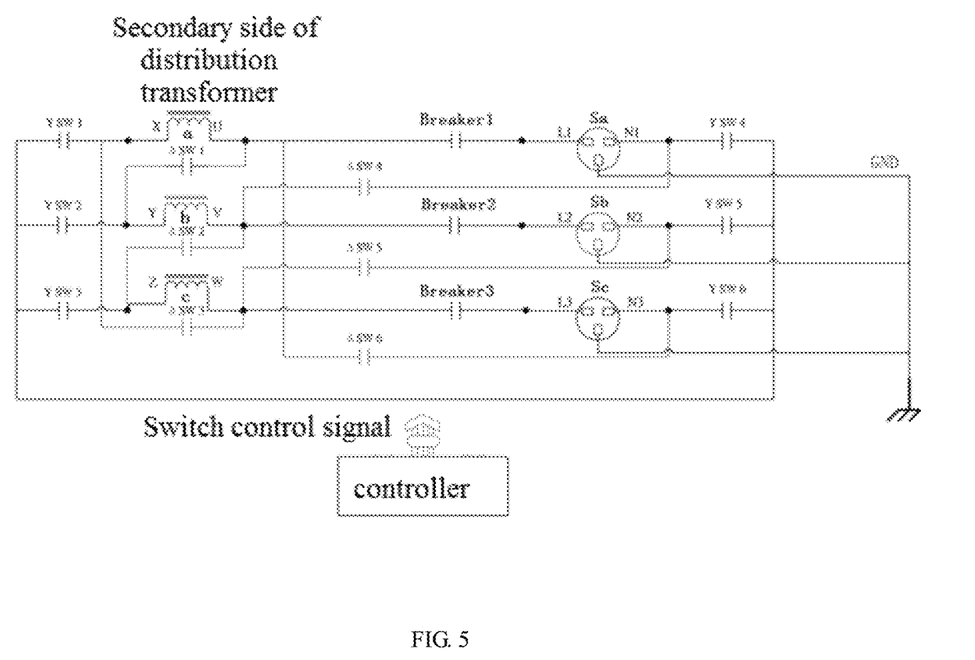
FIG. 5 is a schematic diagram illustrating specific structures of a power distribution unit according to one or more embodiments.

Based on the above-mentioned embodiment, reference is made to FIG. 5, which is a schematic diagram illustrating structures of the power distribution unit provided by the embodiment of the present disclosure.

As shown in FIG. 5, as an embodiment, the three phase windings include an a-phase winding, a b-phase winding and a c-phase winding; the three monophase sockets S include an a-phase socket Sa, a b-phase socket Sb and a c-phase socket Sc; the star-connected switching circuit 100 includes a first star switch YSW1, a second star switch YSW2, a third star switch YSW3, a fourth star switch YSW4, a fifth star switch YSW5 and a sixth star switch YSW6.

A first terminal of the first star switch YSW1 is connected with a first terminal of the a-phase winding, a second terminal of the a-phase winding is connected with the live wire terminal of the a-phase socket Sa; a first terminal of the second star switch YSW2 is connected with a first terminal of the b-phase winding, a second terminal of the b-phase winding is connected with the live wire terminal of the b-phase socket Sb; a first terminal of the third star switch YSW3 is connected with a first terminal of the c-phase winding, a second terminal of the c-phase winding is connected with the live wire terminal of the c-phase socket Sc; a first terminal of the fourth star switch YSW4 is connected with the neutral wire terminal of the a-phase socket Sa; a first terminal of the fifth star switch YSW5 is connected with the neutral wire terminal of the b-phase winding Sb; a first terminal of the sixth star switch YSW6 is connected with the neutral wire terminal of the c-phase socket Sc; second terminals of the first star switch YSW1 to the sixth star switch YSW6 are connected together; control terminals of the first star switch YSW1 to the sixth star switch YSW6 are all connected with the controller 300; and the earth wire terminals of the a-phase socket Sa, the b-phase socket Sb and the c-phase socket Sc are all grounded.

The controller 300 is further configured to control all the six star switches in the star-connected switching circuit 100 to be turned on when the current three-phase power wiring requirement of the power distribution unit is a star connection requirement.

The star-connected switching circuit 100 of the present disclosure includes the first star switch YSW1, the second star switch YSW2, the third star switch YSW3, the fourth star switch YSW4, the fifth star switch YSW5 and the sixth star switch YSW6, and the working principle thereof is described below.

When the current three-phase power wiring requirement of the power distribution unit is the star connection requirement, the controller 300 controls the first star switch YSW1, the second star switch YSW2, the third star switch YSW3, the fourth star switch YSW4, the fifth star switch YSW5 and the sixth star switch YSW6 to be turned on, so that the three phase windings on the secondary side of the distribution transformer are connected according to the star connection mode (the star connection mode means that three phase tail ends of the three phase windings on the secondary side of the distribution transformer are connected together, and the head end of the three phases is a power supply end. At this time, two voltage levels exist, namely, a line voltage and a phase voltage, and the line voltage is about 1.73 times of the phase voltage, and the line current is equal to the phase current), and the three-phase power under the star connection mode is supplied to the three monophase sockets S respectively.

As an embodiment, the three phase windings include an a-phase winding, a b-phase winding and a c-phase winding; the three monophase sockets S include an a-phase socket Sa, a b-phase socket Sb and a c-phase socket Sc; the delta-connected switching circuit 200 includes a first delta switch ΔSW1, a second delta switch ΔSW2, a third delta switch ΔSW3, a fourth delta switch ΔSW4, a fifth delta switch ΔSW5 and a sixth delta switch ΔSW6.

A first terminal of the first delta switch ΔSW1 is connected with a second terminal of the a-phase winding, the live wire terminal of the a-phase socket Sa and a first terminal of the sixth delta switch ΔSW6; a second terminal of the first delta switch ΔSW1 is connected with a first terminal of the b-phase winding; a first terminal of the second delta switch ΔSW2 is connected with a second terminal of the b-phase winding, the live wire terminal of the b-phase socket Sb and a first terminal of the fourth delta switch ΔSW4; a second terminal of the second delta switch ΔSW2 is connected with a first terminal of the c-phase winding; a first terminal of the third delta switch ΔSW3 is connected with a second terminal of the c-phase winding, the live wire terminal of the c-phase socket Sc and a first terminal of the fifth delta switch ΔSW5; a second terminal of the third delta switch ΔSW3 is connected with a first terminal of the a-phase winding; a second terminal of the fourth delta switch ΔSW4 is connected with the neutral wire terminal of the a-phase socket Sa; a second terminal of the fifth delta switch ΔSW5 is connected with the neutral wire terminal of the b-phase socket Sb; a second terminal of the sixth delta switch ΔSW6 is connected with the neutral wire terminal of the c-phase socket Sc; and the earth wire terminals of the a-phase socket Sa, the b-phase socket Sb and the c-phase socket Sc are all grounded.

The controller 300 is further configured to control all the six delta switches in the delta-connected switching circuit 200 to be turned on when the current three-phase power wiring requirement of the power distribution unit is a delta connection requirement.

The delta-connected switching circuit 200 of the present disclosure includes the first delta switch Δ SW1, the second delta switch Δ SW2, the third delta switch Δ SW3, the fourth delta switch Δ SW4, the fifth delta switch Δ SW5 and the sixth delta switch Δ SW6, and the working principle thereof is described below.

When the current three-phase power wiring requirement of the power distribution unit is the delta connection requirement, the controller 300 controls all the first delta switch Δ SW1, the second delta switch Δ SW2, the third delta switch Δ SW 3, the fourth delta switch Δ SW4, the fifth delta switch Δ SW5, and the sixth delta switch Δ SW6 to be turned on, so that the three phase windings on the secondary side of the distribution transformer are connected in the delta connection mode (the delta connection mode means that the three phase windings on the secondary side of the distribution transformer are connected end to end, and the three end-points are power terminals, in this case, merely one voltage level exists, the line voltage is equal to the phase voltage, and the line current is equal to about 1.73 times of the phase current), and the three-phase power under the delta connection mode is supplied to the three monophase sockets S respectively.

Figure 6:
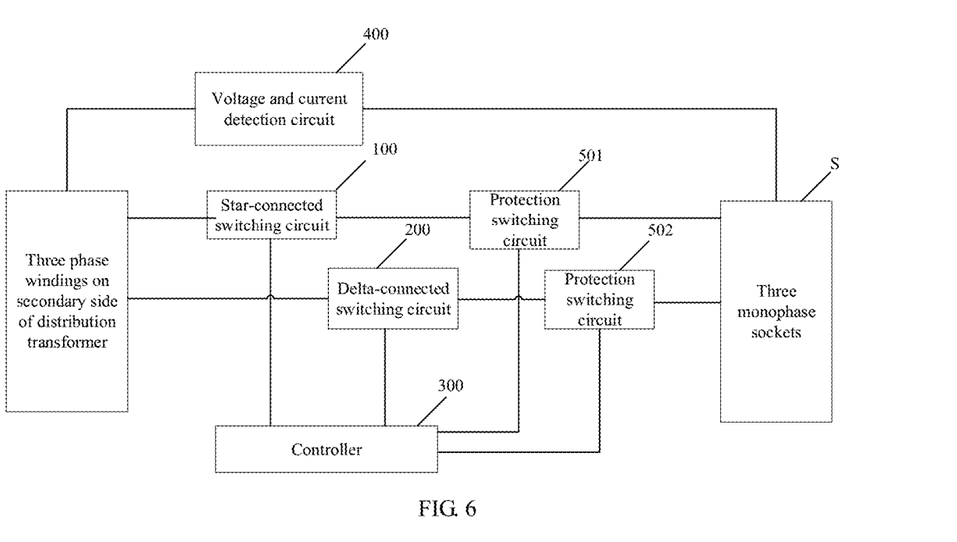
FIG. 6 is a schematic structural diagram illustrating a power distribution unit according to one or more embodiments.

Reference is made to FIG. 6, which is a schematic structural diagram illustrating another power distribution unit provided by an embodiment of the present disclosure.

As an embodiment, the power distribution unit further includes a voltage and current detection circuit 400 and protection switching circuits 501, 502.

The voltage and current detection circuit 400 is connected with the three phase windings and the three monophase sockets S, and is configured to detect the input voltage, the input current, the output voltage and output current of each phase of the power distribution unit.

The protection switching circuits 501, 502 are disposed on the connection line between the three phase windings and the three monophase sockets S, and connected with the controller 300.

The controller 300 is further configured to: when the input voltage/input current and/or the output voltage/output current of any target phase of the power distribution unit do not meet a preset safety standard, control the protection switching circuits 501, 502 to disconnect a target connection line between a target phase winding and a target phase socket.

Further, the power distribution unit of the present disclosure further includes the voltage and current detection circuit 400 and the protection switching circuits 501, 502, and the working principle thereof is described below.

The protection switching circuits 501, 502 are disposed on the connection line between the three phase windings on the secondary side of the distribution transformer and the three monophase sockets S. The voltage and current detection circuit 400 may detect the input voltage, the input current, the output voltage and the output current of each phase of the power distribution unit, and provide the input voltage, the input current, the output voltage and the output current of each phase of the power distribution unit to the controller 300. When the input voltage/input current and/or output voltage/output current of any phase (called target phase) of the power distribution unit do not meet a preset safety standard, the controller 300 controls the protection switching circuits 501, 502 to disconnect the target connection line between the winding of the target phase and the socket of the target phase.

For example, when the a-phase input voltage/a-phase input current and/or a-phase output voltage/a-phase output current of the power distribution unit do not meet the preset safety standard, the controller 300 controls the protection switching circuits 501, 502 to disconnect the a-phase connection line between the a-phase winding and the a-phase socket Sa. When the b-phase input voltage/b-phase input current and/or b-phase output voltage/b-phase output current of the power distribution unit do not meet the preset safety standard, the controller 300 controls the protection switching circuits 501, 502 to disconnect the b-phase connection line between the b-phase winding and the b-phase socket Sb. When the c-phase input voltage/c-phase input current and/or c-phase output voltage/c-phase output current of the power distribution unit do not meet the preset safety standard, the controller 300 controls the protection switching circuits 501, 502 to disconnect the c-phase connection line between the c-phase winding and the c-phase socket Sc.

Figure 7:
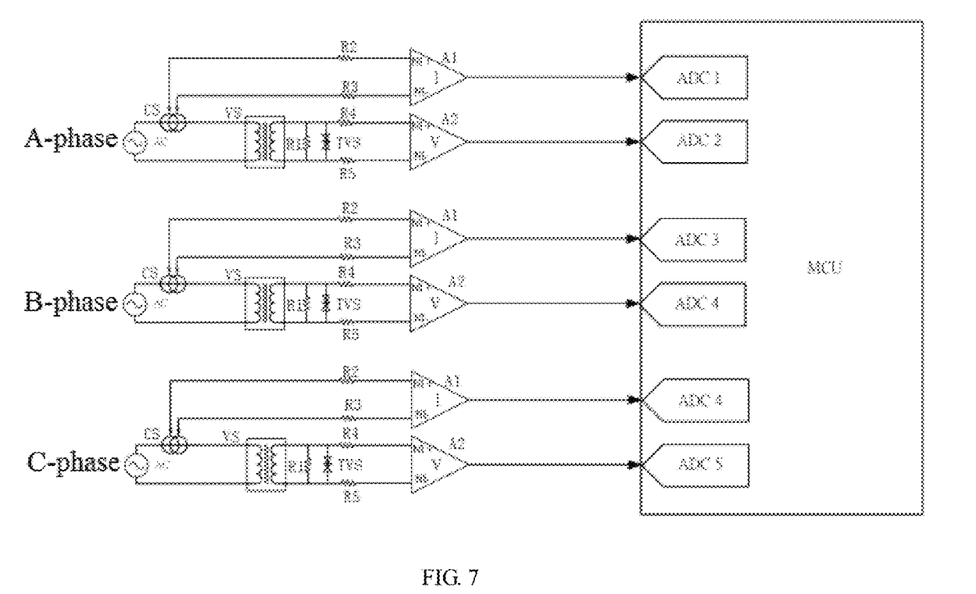
FIG. 7 is a schematic structural diagram illustrating a voltage and current detection circuit for three phase windings on a secondary side of the distribution transformer according to one or more embodiments.
Figure 8:
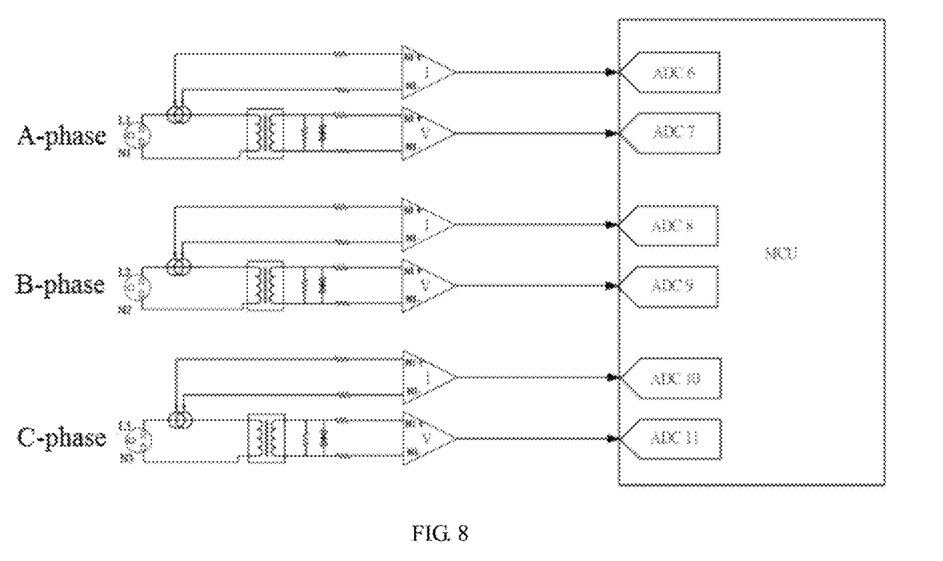
FIG. 8 is a schematic structural diagram illustrating a voltage and current detection circuit for three monophase sockets according to one or more embodiments.

Referring to FIG. 7 and FIG. 8, FIG. 7 is a schematic structural diagram illustrating the voltage and current detection circuit 400 for three phase windings on the secondary side of the distribution transformer provided by an embodiment of the present disclosure, and FIG. 8 is a schematic structural diagram illustrating the voltage and current detection circuit 400 for the three monophase sockets provided by an embodiment of the present disclosure.

As an embodiment, the voltage and current detection circuit 400 includes three sub-detection circuits that are configured to detect three monophase power input by the three phase windings respectively and three sub-detection circuits that are configured to detect monophase power output by each of the three monophase sockets S respectively. Each of the sub-detection circuits includes:
- a current sensing element CS for detecting a current signal of a corresponding target monophase power;
- a first differential amplifier A1 that is connected with the current sensing element CS, and used for amplifying the current signal to obtain an amplified current signal;
- a voltage sensing element VS for detecting a voltage signal of the target monophase power; and
- a second differential amplifier A2 that is connected with the voltage sensing element VS, and used for amplifying the voltage signal to obtain an amplified voltage signal.

In addition, the three phase windings include an a-phase winding, a b-phase winding and a c-phase winding; the three monophase sockets S include an a-phase socket Sa, a b-phase socket Sb and a c-phase socket Sc; and the protection switching circuit includes an a-phase protection switch Breaker1, a b-phase protection switch Breaker2 and a c-phase protection switch Breaker3.

A first terminal of the a-phase protection switch Breaker1 is connected with a second terminal of the a-phase winding, a second terminal of the a-phase protection switch Breaker1 is connected with the live wire terminal of the a-phase socket Sa; a first terminal of the b-phase protection switch Breaker2 is connected with a second terminal of the b-phase winding, a second terminal of the b-phase protection switch Breaker2 is connected with the live wire terminal of the b-phase socket Sb; a first terminal of the c-phase protection switch Breaker3 is connected with a second terminal of the c-phase winding, a second terminal of the c-phase protection switch Breaker3 is connected with the live wire terminal of the c-phase socket Sc; and the control terminals of the a-phase protection switch Breaker1, the b-phase protection switch Breaker2 and the c-phase protection switch Breaker3 are all connected with the controller 300.

The controller 300 is further configured to control the protection switch corresponding to the target monophase power to be turned off when the current amplification signal and/or the voltage amplification signal of the target monophase power do not meet a preset safety standard.

The voltage and current detection circuit 400 of the present disclosure includes three sub-detection circuits (as shown in FIG. 7), that are configured to detect three monophase power input by the three phase windings on the secondary side of the distribution transformer respectively, and three sub-detection circuits (as shown in FIG. 8), that are configured to detect monophase power output by each of the three monophase sockets S; each of the sub-detection circuits includes the current sensing element CS, the first differential amplifier A1, the voltage sensing element VS and the second differential amplifier A2; the protection switchING circuit includes the a-phase protection switch Breaker1, the b-phase protection switch Breaker2 and the c-phase protection switch Breaker3. The working principle of the voltage and current detection circuit is described below.

Taking the sub-detection circuit for detecting the a-phase power input by the a-phase winding on the secondary side of the distribution transformer as an example, the current sensing element CS detects the current signal of the a-phase power input by the a-phase winding, and inputs the current signal of the a-phase power to the first differential amplifier A1. The current signal of the a-phase power is amplified by the first differential amplifier A1, and an amplified a-phase current signal is obtained. The amplified a-phase current signal is provided to the controller 300 (for example a Microcontroller Unit (MCU), which receives a detection signal through an Analog-to-digital converter (ADC) interface). The voltage sensing element VS detects the a-phase voltage signal input by the a-phase winding, and inputs the a-phase voltage signal to the second differential amplifier A2. The a-phase voltage signal is amplified by the second differential amplifier A2 to obtain an amplified a-phase voltage signal, and the amplified a-phase voltage signal is provided to the controller 300. The controller 300 controls the a-phase protection switch Breaker1 to be turned off when the amplified a-phase current signal and/or the amplified a-phase voltage signal do not meet the preset safety standard. It should be noted that, detection principles of other sub-detection circuits are similar, and details are not described herein again in the present disclosure.

In addition, each of the sub-detection circuits may further include: a resistor R1 and a transient voltage suppressor (TVS) that are connected in parallel with the voltage sensing element VS; and resistors R2, R3, R4 and R5 disposed at input terminals of the first differential amplifier A1 and the second differential amplifier A2. Among them, the resistor R1 is used for matching the input impedance, thereby improving the measurement accuracy; the TVS is used for lightning protection; the resistors R2, R3, R4 and R5 are used for current limiting.

Each of the switches in the star-connected switching circuit 100, the delta-connected switching circuit 200 and the protection switching circuit of the present disclosure may have three options: a relay, an electromagnetic contact switch and an Insulated Gate Bipolar Transistor (IGBT) switch.

The relay, also known as an electric relay, is an electronic control component including a control system (also known as an input loop) and a controlled system (also known as an output loop). The relay is generally applied to an automatic control circuit. The relay is actually an automatic switch that controls a large current with a small current, thus it plays roles of automatic adjustment, safety protection and conversion circuit and the like in the circuit.

As the name implies, the electromagnetic contact switch is a switch controlled by an electromagnet, that is, a combination of an electromagnet and a switch. When the electromagnet coil is energized, an electromagnetic force is generated, and the movable iron core pushes or pulls the contact of the switch to be closed, thereby turning the controlled circuit on. Electromagnetic switches are widely used in various industries, and mostly used as contactors in industrial fields. The electromagnetic switch is a control switch on a starting engine (a DC motor, a transmission meshing mechanism and an electromagnetic switch), and it is one of the three parts of the starting engine. The working principle of the electromagnetic switch is as follows: the coil generates an electromagnetic force after being energized, which makes the movable iron core move, so that on the one hand, the transmission meshing mechanism is pulled to move a starting engine pinion forward and mesh with a flywheel gear ring of the engine, on the other hand, the switch contact is pushed to be turned on, thereby energizing the DC motor to run and further driving the engine to start.

The IGBT switch is a semiconductor device, which is mainly used for the output control of AC motors of electric vehicles, railway locomotives and D-Series high speed train. Although the traditional Bipolar Junction Transistor (BJT) has a small on-resistance, the driving current thereof is large. On the other hand, the metal-oxide-semiconductor field-effect transistor (MOSFET) has the advantage of a small driving current although the on-resistance thereof is large. The IGBT has the advantages of both of the BJT and the MOSFET, that is, the IGBT has not only a small driving current, but also a low on-resistance.

The relay and the electromagnetic contact switch are generally composed of an iron core, a coil, an armature, a contact reed, and the like. They involve mechanical movement, include moving parts, contacts, and generate sparks during switching, resulting in a slow reaction speed and a short service life. The IGBT switch may be regarded as a solid-state relay, that involves no mechanical movements and includes no moving parts, but has essentially the same function as an electromagnetic relay. The solid-state relay is a contactless switch component composed of only solid-state electronic components. It uses the electrical, magnetic and optical characteristics of the electronic component to achieve the isolation of the input and the output, and utilizes the switching characteristics of a high-power tripolar body, a power field effect transistor, a unidirectional silicon controlled rectifier or a bidirectional silicon controlled rectifier so that a controlled circuit is turned on and turned off without contacts and sparks. The solid-state relay has high agility, low control power, long service life and good reliability, and the switching speed may reach several milliseconds to several microseconds. Most of solid-state relays with AC outputs are a zero-voltage switch, which is turned on at the zero voltage and turned off at the zero current, thus the abrupt interruption of the current waveform is reduced and the switching transient effect is reduced. Therefore, the switch of the present disclosure is preferably an IGBT switch.

Figure 9:
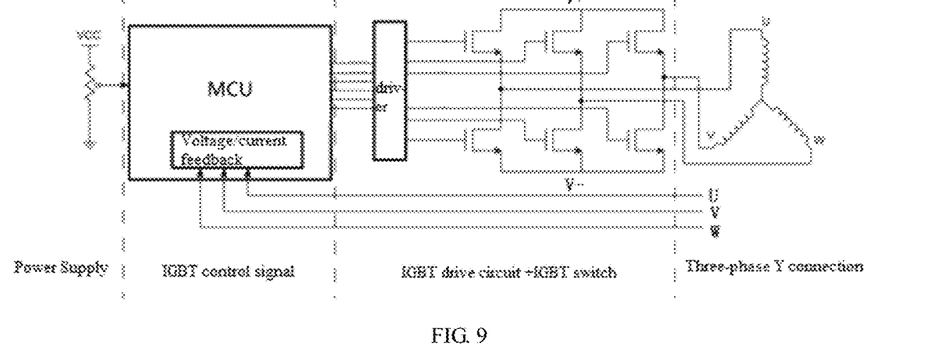
FIG. 9 is a schematic structural diagram illustrating six star switches driven by a controller according to one or more embodiments.

As shown in FIG. 9, the controller (for example an MCU) controls an IGBT driving circuit to generate six pulse width modulation (PWM) signals, and the six PWM signals are respectively provided to sixth IGBT switches (referred to herein as the star switch) to drive the six IGBT switches to be turned on. When the six IGBT switches are turned on, the three phase windings on the secondary side of the distribution transformer are connected in the star connection mode. The voltage and current detection circuit may detect the voltage/current signals input by each phase winding on the secondary side of the distribution transformer and feed back the detected voltage/current signals to the MCU. The MCU adjusts the PWM signal generated by the IGBT driving circuit according to the voltage/current signal fed back, so that a target voltage/current signal is input on each phase winding on the secondary side of the distribution transformer.

As an embodiment, the controller 300 is further configured to:
in response to the input voltage of a target phase being continuously greater than a first preset high voltage threshold for more than a first preset time, control the protection switching circuit to disconnect a target connection line;
in response to the input voltage of the target phase being continuously less than a preset low voltage threshold for more than a second preset time, control the protection switching circuit to disconnect the target connection line;
in response to the input current of the target phase being continuously greater than a first preset high current threshold for more than a third preset time, control the protection switching circuit to disconnect the target connection line;
in response to the output voltage of the target phase being continuously greater than a second preset high voltage threshold for more than a fourth preset time, control the protection switching circuit to disconnect the target connection line;
in response to the output current of the target phase being continuously greater than a second preset high current threshold for more than a fifth preset time, control the protection switching circuit to disconnect the target connection line.

The controller 300's criterion for determining whether the input and output of any target phase is normal is as follows:
1) Input Determination Criterion:
① If the input voltage of the target phase is greater than a first preset high voltage threshold (for example, 110% of an input nominal voltage of the target phase), and the time during which the input voltage of the target phase is greater than the first preset high voltage threshold exceeds a first preset time (for example, 20 ms), it is regarded as an input OVP (over voltage protection) of the target phase, the protection switching circuit is controlled to turn off the protection switch corresponding to the target phase, and the monophase socket of the target phase has no output.
② If the input voltage of the target phase is less than a preset low voltage threshold (for example, 90% of the input nominal voltage of the target phase), and the time during which the input voltage of the target phase is less than the preset low voltage threshold exceeds a second preset time (for example, 20 ms), it is regarded as an input UVP (under voltage protection) of the target phase, the protection switching circuit is controlled to turn off the protection switch corresponding to the target phase, and the monophase socket of the target phase has no output.
③ If the input current of the target phase is greater than a first preset high current threshold (for example, 120% of an input nominal current of the target phase), and the time during which the input current of the target phase exceeds the first preset high current threshold exceeds a third preset time (for example, 20 ms), it is regarded as an input OCP (over current protection) of the target phase, the protection switching circuit is controlled to turn off the protection switch corresponding to the target phase, and the monophase socket of the target phase has no output.
2) Output Determination Criterion:
① If the output voltage of the target phase is greater than a second preset high voltage threshold (for example, 250 Vac), and the time during which the output voltage of the target phase is greater than the second preset high voltage threshold exceeds a fourth preset time (for example, 20 ms), it is regarded as an output OVP of the target phase, the protection switching circuit is controlled to turn off the protection switch corresponding to the target phase, and the monophase socket of the target phase has no output.
② If the output current of the target phase is greater than a second preset high current threshold (for example, 10 A), and the time during which the output current of the target phase is greater than the second preset high current threshold exceeds a fifth preset time (for example, 20 ms), it is regarded as an output OCP of the target phase, the protection switching circuit is controlled to turn off the protection switch corresponding to the target phase, and the monophase socket of the target phase has no output.

As an embodiment, the controller 300 is further configured to:
- calculate a first phase difference θ1 between the input voltage and the input current of the target phase, and calculate an input power factor COS $\theta_1$ of the target phase based on the first phase difference;
- multiply the input voltage of the target phase with the input current of the target phase and then multiply with the input power factor, and obtain input power consumption of the target phase;
- calculate a second phase difference $\theta_2$ between the output voltage and the output current of the target phase, and calculate an output power factor COS $\theta_2$ of the target phase based on the second phase difference; and
- multiply the output voltage of the target phase with the output current of the target phase and then multiply with the output power factor, and obtain output power consumption of the target phase.

Further, under the signal detection of the voltage and current detection circuit, the controller 300 may further calculate the input power consumption and output power consumption of any target phase. The calculation process of the input power consumption of the target phase includes: calculating the first phase difference $\theta_1$ between the input voltage $V_{in}$ and the input current $I_{in}$ of the target phase, and taking the cosine computation COS $\theta_1$ of the first phase difference $\theta_1$ as an input power factor of the target phase, multiplying the input voltage $V_{in}$ of the target phase with the input current $I_{in}$ of the target phase and multiplying with the input power factor COS $\theta_1$ thereafter, thereby obtaining the input power consumption $P_{in}$ of the target phase, that is, $P_{in}=V_{in}*I_{in}*COS \theta_1$. Similarly, the calculation process of the output power consumption of the target phase includes: calculating a second phase difference $\theta_2$ between the output voltage $V_{out}$ and the output current $I_{out}$ of the target phase, taking the cosine computation COS $\theta_2$ of the second phase difference $\theta_2$ as an output power factor of the target phase, and multiplying the output voltage $V_{out}$ of the target phase with the output current $I_{out}$ of the target phase and multiplying with the output power factor COS $\theta_2$ thereafter, thereby obtaining the output power consumption $P_{out}$ of the target phase, that is, $P_{out}=V_{out}*I_{out}*COS \theta_2$.

Figure 10:
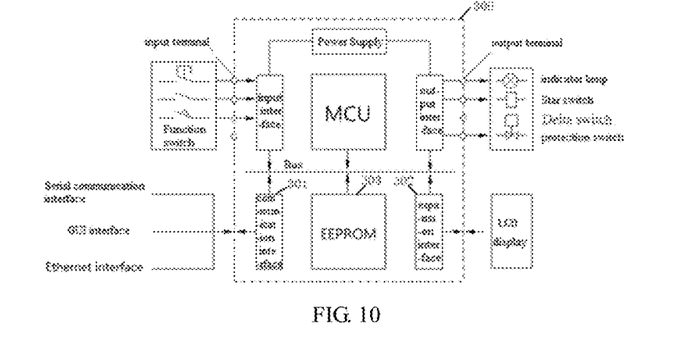
FIG. 10 is a schematic structural diagram illustrating a controller according to one or more embodiments.

Reference is made to FIG. 10, which is a schematic structural diagram illustrating a controller provided by an embodiment of the present disclosure.

As an embodiment, the controller 300 further includes a communication interface 301 connected with an external apparatus.

The controller 300 is further configured to communicate data with the external apparatus through the communication interface 301, and complete a corresponding processing function.

Further, the controller 300 of the present disclosure further includes a communication interface 301 connected with an external apparatus, and the controller 300 may perform data communication with the external apparatus through the communication interface 301 to complete a corresponding processing function.

As an embodiment, the controller 300 further includes an expansion interface 302 connected with a display.

The controller 300 is further configured to control the display to display a specified content through the expansion interface 302.

Further, the controller 300 of the present disclosure further includes an expansion interface 302 connected with a display, and the controller 300 may control the display to display a specified content through the expansion interface 302.

The controller 300 drives an LCD screen (such as Liquid Crystal Display) with an 8 bit data bus through the expansion interface, and synchronously supports basic drawing operations of a Graphical User Interface (GUI).

As an embodiment, the communication interface 301 includes:
- an Ethernet interface for accessing Ethernet to achieve a remote communication with a master computer; the master computer is configured to remotely access the controller 300 through the Ethernet, to acquire relevant control information of the controller 300;
- a GUI interface connected with a first Personal Computer (PC); the first PC is configured to send a user instruction to the controller 300 through the GUI interface, so that the controller 300 performs a corresponding control operation according to the user instruction; and
- a serial communication interface connected with a second PC; the second PC is configured to upgrade firmware of the controller 300 through the serial communication interface.

The communication interface 301 of the controller 300 includes: the Ethernet interface, for example an RJ45 interface supporting adaptive network connection speeds of 10 megabytes and 100 megabytes, and a common RJ45 interface includes two types, that is, a Data Terminal Equipment (DTE) type for Ethernet network cards, a DTE type for a router Ethernet interface, and a pin of the RJ45 is connected to a communication pin of the controller through a group of isolation transformers); the GUI interface; and the serial communication interface (for example an RS232 interface). The working principle of the communication interface is described below.

The Ethernet interface is accessed to the Ethernet to realize the remote communication with the master computer. The master computer may remotely access the controller 300 through the Ethernet to acquire relevant control information (for example logs, events, alarms, notifications, and the like) of the controller 300, and may also issue control instructions to the controller 300 through the Ethernet, so that the controller 300 may perform corresponding control operations according to the control instructions.

The GUI interface is connected with the first PC, and the first PC may send an user instruction to the controller 300 through the GUI interface, so that the controller 300 may perform corresponding control operations according to the user instruction. For example, the first PC may send a display instruction containing a target display content to the controller 300 through the GUI interface, so that the controller 300 may control the display to display the target display content according to the display instruction.

The serial communication interface is connected with the second PC, and the second PC may upgrade the firmware of the controller 300 through the serial communication interface.

In addition, the controller 300 may further include an Electrically Erasable Programmable Read-Only Memory (EEPROM) 303. The controller 300 may store the input/output voltage/current/power of each phase and a connection status of the PDU in the EEPROM 303, and may also display content stored in the EEPROM 303 on the LCD screen.

The controller 300 may also be connected with some function switches. If different function switches are turned on and the display needs to display different display contents, the controller 300 may control the display to display corresponding display content according to the turn-on conditions of the function switches. The controller 300 may also be connected with an indicator lamp, and the controller 300 may control the indicator lamp to be turned on when the input voltage of any target phase is overvoltage or undervoltage or the input current is overcurrent or the output voltage is overvoltage or the output current is overcurrent, to play an alarm role.

To sum up, control examples of the star connection condition, the delta connection condition and the protection status are given.

Figure 11:
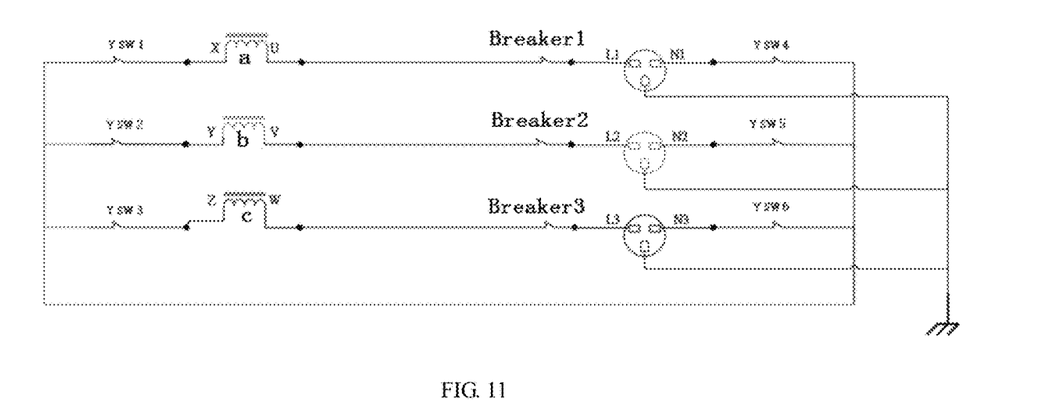
FIG. 11 is a diagram illustrating a star connection of power distribution units according to one or more embodiments.

FIG. 11 is a diagram illustrating the star connection mode of the power distribution unit. In this case, the controller enables YSW1 to YSW6 to be turned on, ΔSW1 to ΔSW6 are controlled to be in an open circuit state (not shown in FIG. 11 due to the open circuit), and Breaker1 to Breaker3 are all turned on, and Breaker1 to Breaker3 will be turned off only when protection is required.

Figure 12:
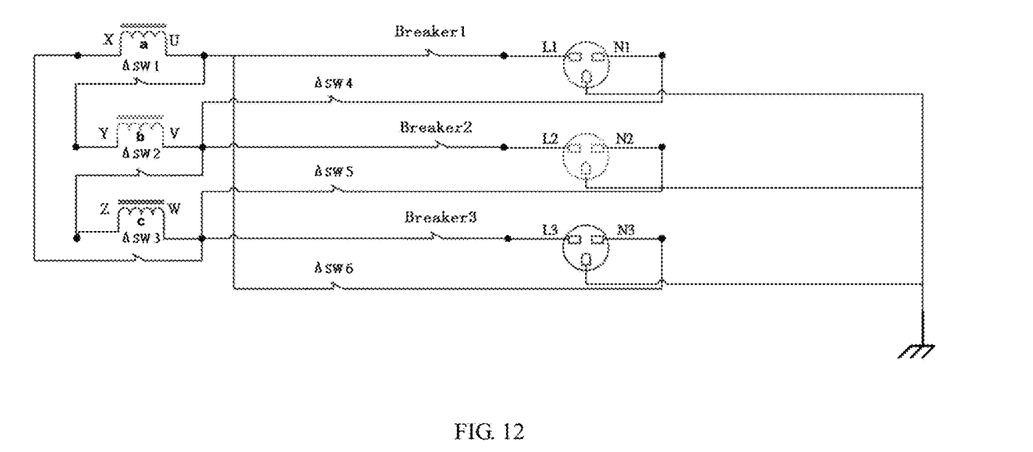
FIG. 12 is a diagram illustrating a delta connection of power distribution units according to one or more embodiments.

FIG. 12 is a diagram illustrating the delta connection mode of the power distribution unit. In this case, the controller controls YSW1 to YSW6 to be in the open circuit state (not shown in FIG. 12 due to the open circuit), enables ΔSW1 to ΔSW6 to be turned on, controls all of Breaker1 to Breaker3 to be turned on, and Breaker1 to Breaker3 will be turned off only when protection is required.

Figure 13:
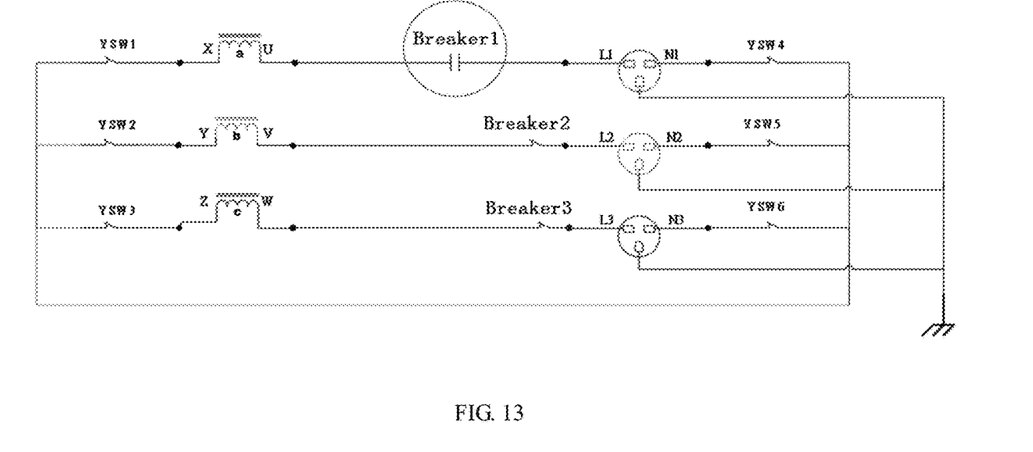
FIG. 13 is a diagram illustrating A-phase protection of the star connection of the power distribution unit according to one or more embodiments.

FIG. 13 is a diagram illustrating A-phase protection of the power distribution unit in the star connection mode. In this case, the controller enables YSW1 to YSW6 to be turned on, controls ΔSW1 to ΔSW6 to be in the open circuit state (not shown in FIG. 13 due to the open circuit), controls Breaker1 to be turned off for protection, and controls both of Breaker2 and Breaker3 to be turned on.

Figure 14:
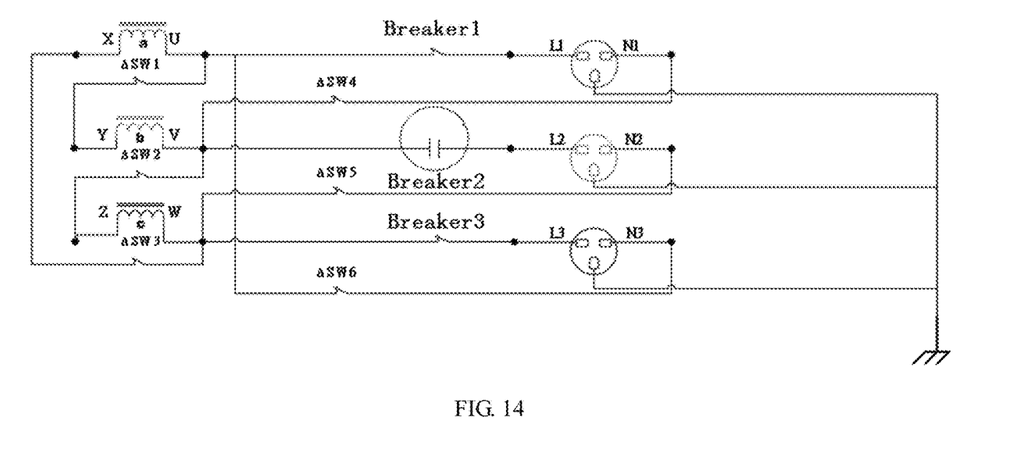
FIG. 14 is a diagram illustrating B-phase protection of the delta connection of the power distribution unit according to one or more embodiments.

FIG. 14 is a diagram illustrating B-phase protection of the power distribution unit in the delta connection mode. In this case, the controller controls YSW1 to YSW6 to be in the open circuit state (not shown in FIG. 14 due to the open circuit), enables ΔSW1 to ΔSW6 to be turned on, controls Breaker2 to be turned off for protection, and controls both of Breaker1 and Breaker3 to be turned on.

Figure 15:
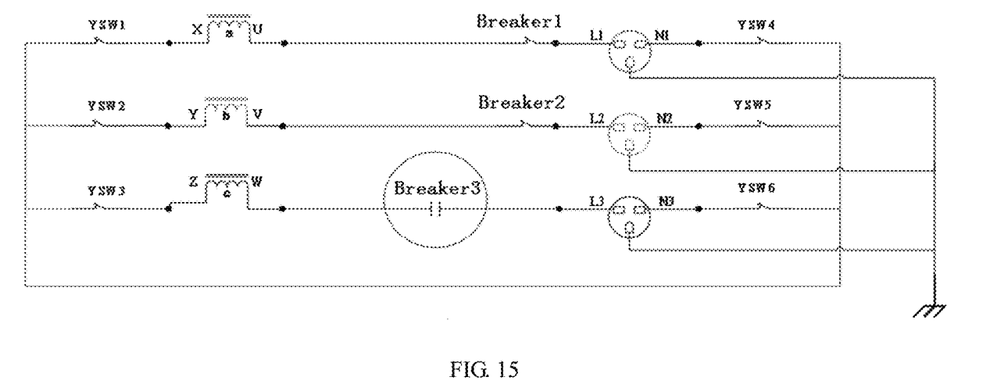
FIG. 15 is a diagram illustrating C-phase protection of the star connection of the power distribution unit according to one or more embodiments.

FIG. 15 is a diagram illustrating C-phase protection of the power distribution unit in the star connection mode. In this case, the controller enables YSW1 to YSW6 to be turned on, controls ΔSW1 to ΔSW6 to be in the open circuit state (not shown in FIG. 15 due to the open circuit), controls Breaker3 to be turned off for protection, and controls both of Breaker1 and Breaker2 to be turned on.

It should be noted that, protection principle of each phase of the star connection and delta connection of the power distribution unit is similar, and will not be described herein.

It should also be noted that, in the present specification, relational terms for example first and second are merely used to distinguish one entity or operation from another entity or operation, and do not necessarily require or imply any such actual relationship or order between those entities or operations. Moreover, the terms "include", "include" or any other variation thereof are intended to cover non-exclusive inclusion, so that a process, method, product or apparatus including a series of elements includes not only those elements, but also other elements not explicitly listed or elements inherent to such process, method, product or apparatus. Without further restrictions, an element defined by the phrase "include one" does not exclude the existence of other identical elements in the process, method, article or equipment including the element.

Those skilled in the art can make or use the present application based on the above description of the disclosed embodiments. Various modifications to those embodiments will be apparent to those skilled in the art, and the general principles defined herein may be implemented in other embodiments without departing from the spirit or scope of the present disclosure. Therefore, the present disclosure is not to be limited to the embodiments shown herein, but is to be accorded the widest scope consistent with the principles and novel features disclosed herein.

The invention claimed is:

1. A power distribution unit, comprising:

three monophase sockets, wherein, among the three monophase sockets, any target monophase socket is configured to be connected with an electrical apparatus conforming to voltage of the target monophase socket;

a star-connected switching circuit connected with three phase windings on a secondary side of a distribution transformer and the three monophase sockets;

a delta-connected switching circuit connected with the three phase windings and the three monophase sockets; and a controller, wherein the controller is connected with the star-connected switching circuit and the delta-connected switching circuit, and configured to correspondingly control the star-connected switching circuit or the delta-connected switching circuit to be turned on according to a current three-phase power wiring requirement of the power distribution unit, so that the three phase windings are connected according to a target wiring mode conforming to the three-phase power wiring requirement, and three phase power under the target wiring mode is supplied to the three monophase sockets respectively.

2. The power distribution unit according to claim 1, wherein the three phase windings comprise an a-phase winding, a b-phase winding and a c-phase winding; the three monophase sockets comprise an a-phase socket, a b-phase socket and a c-phase socket; the star-connected switching circuit comprises a first star switch, a second star switch, a third star switch, a fourth star switch, a fifth star switch and a sixth star switch; wherein, a first terminal of the first star switch is connected with a first terminal of the a-phase winding, a second terminal of the a-phase winding is connected with a live wire terminal of the a-phase socket, a first terminal of the second star switch is connected with a first terminal of the b-phase winding, a second terminal of the b-phase winding is connected with the live wire terminal of the b-phase socket, a first terminal of the third star switch is connected with a first terminal of the c-phase winding, a second terminal of the c-phase winding is connected with the live wire terminal of the c-phase socket, a first terminal of the fourth star switch is connected with a neutral wire terminal of the a-phase socket, a first terminal of the fifth star switch is connected with the neutral wire terminal of the b-phase socket, a first terminal of the sixth star switch is connected with the neutral wire terminal of the c-phase socket, second terminals of the first star switch to the sixth star switch are connected, and control terminals of the first star switch to the sixth star switch are all connected with the controller, and earth wire terminals of the a-phase socket, the b-phase socket and the c-phase socket are all grounded;

the controller is further configured to, when the current three-phase power wiring requirement of the power distribution unit is a star connection requirement, control all the six star switches in the star-connected switching circuit to be turned on.

3. The power distribution unit according to claim 1, wherein the three phase windings comprise an a-phase winding, a b-phase winding and a c-phase winding; the three monophase sockets comprise an a-phase socket, a b-phase socket and a c-phase socket; the delta-connected switching circuit comprises a first delta switch, a second delta switch, a third delta switch, a fourth delta switch, a fifth delta switch and a sixth delta switch; wherein, a first terminal of the first delta switch is connected with a second terminal of the a-phase winding, a live wire terminal of the a-phase socket and a first terminal of the sixth delta switch, respectively, a second terminal of the first delta switch is connected with a first terminal of the b-phase winding, a first terminal of the second delta switch is connected with a second terminal of the b-phase winding, the live wire terminal of the b-phase socket and a first terminal of the fourth delta switch, respectively, a second terminal of the second delta switch is connected with a first terminal of the c-phase winding, a first terminal of the third delta switch is connected with a second terminal of the c-phase winding, the live wire terminal of the c-phase socket and a first terminal of the fifth delta switch, respectively, a second terminal of the third delta switch is connected with a first terminal of the a-phase winding, a second terminal of the fourth delta switch is connected with a neutral wire terminal of the a-phase socket, a second terminal of the fifth delta switch is connected with the neutral wire terminal of the b-phase socket, a second terminal of the sixth delta switch is connected with the neutral wire terminal of the c-phase socket, and earth wire terminals of the a-phase socket, the b-phase socket and the c-phase socket are all grounded;

the controller is further configured to, when the current three-phase power wiring requirement of the power distribution unit is a delta connection requirement, control all the six delta switches in the delta-connected switching circuit to be turned on.

4. The power distribution unit according to claim 1, further comprising:

a voltage and current detection circuit, wherein the voltage and current detection circuit is connected with the three phase windings and the three monophase sockets respectively, and is configured to detect an input voltage, an input current, an output voltage and an output current of each phase of the power distribution unit; and a protection switching circuit, wherein the protection switching circuit is disposed on a connection line between the three phase windings and the three monophase sockets, and connected with the controller;

wherein the controller is further configured to, when at least one of an input voltage, an input current, an output voltage and an output current of any target phase of the power distribution unit does not meet a preset safety standard, control the protection switching circuit to disconnect a target connection line between the winding of the target phase and the socket of the target phase.

5. The power distribution unit according to claim 4, wherein the voltage and current detection circuit comprises three sub-detection circuits for detecting three monophase power input by the three phase windings respectively and three sub-detection circuits for detecting monophase power output by each of the three monophase sockets respectively, and each of the sub-detection circuits comprises:

a current sensing element, configured to detect a current signal of a corresponding target monophase power;

a first differential amplifier, wherein the first differential amplifier is connected with the current sensing element, and configured to amplify the current signal to obtain an amplified current signal;

a voltage sensing element, configured to detect a voltage signal of the target monophase power; and a second differential amplifier, wherein the second differential amplifier is connected with the voltage sensing element, and configured to amplify the voltage signal to obtain an amplified voltage signal;

wherein the three phase windings comprise an a-phase winding, a b-phase winding and a c-phase winding; the three monophase sockets comprise an a-phase socket, a b-phase socket and a c-phase socket; and the protection switching circuit comprises an a-phase protection switch, a b-phase protection switch and a c-phase protection switch; wherein, a first terminal of the a-phase protection switch is connected with a second terminal of the a-phase winding, a second terminal of the a-phase protection switch is connected with a live wire terminal of the a-phase socket, a first terminal of the b-phase protection switch is connected with a second terminal of the b-phase winding, a second terminal of the b-phase protection switch is connected with the live wire terminal of the b-phase socket, a first terminal of the c-phase protection switch is connected with a second terminal of the c-phase winding, a second terminal of the c-phase protection switch is connected with the live wire terminal of the c-phase socket, and control terminals of the a-phase protection switch, the b-phase protection switch and the c-phase protection switch are all connected with the controller;

the controller is further configured to, when at least one of the amplified current signal and the amplified voltage signal of a target monophase power does not meet a preset safety standard, control the protection switch corresponding to the target monophase power to be turned off.

6. The power distribution unit according to claim 4, wherein the controller is further configured to:

in response to the input voltage of the target phase being continuously greater than a first preset high voltage threshold for more than a first preset time, control the protection switching circuit to disconnect the target connection line;

in response to the input voltage of the target phase being continuously less than a preset low voltage threshold for more than a second preset time, control the protection switching circuit to disconnect the target connection line;

in response to the input current of the target phase being continuously greater than a first preset high current threshold for more than a third preset time, control the protection switching circuit to disconnect the target connection line;

in response to the output voltage of the target phase being continuously greater than a second preset high voltage threshold for more than a fourth preset time, control the protection switching circuit to disconnect the target connection line;

in response to the output current of the target phase being continuously greater than a second preset high current threshold for more than a fifth preset time, control the protection switching circuit to disconnect the target connection line.

7. The power distribution unit according to claim 4, wherein the controller is further configured to:
calculate a first phase difference $\theta_1$ between the input voltage and the input current of the target phase, and calculate an input power factor COS $\theta_1$ of the target phase based on the first phase difference;
multiply the input voltage of the target phase with the input current of the target phase and then multiply with the input power factor, and obtain input power consumption of the target phase;
calculate a second phase difference $\theta_2$ between the output voltage and the output current of the target phase, and calculate an output power factor COS $\theta_2$ of the target phase based on the second phase difference; and
multiply the output voltage of the target phase with the output current of the target phase and multiply with the output power factor, and obtain output power consumption of the target phase.

8. The power distribution unit according to claim 1, wherein the controller further comprises:
a communication interface connected with an external apparatus;
wherein the controller is further configured to communicate data with the external apparatus through the communication interface to complete a corresponding processing function.

9. The power distribution unit according to claim 8, wherein the controller further comprises:
an expansion interface connected with a display;
wherein the controller is further configured to control, through the expansion interface, the display to display a specified content.

10. The power distribution unit according to claim 8, wherein the communication interface comprises:
an Ethernet interface, wherein a remote communication with a master computer is achieved by accessing Ethernet through the Ethernet interface, and the master computer is configured to remotely access the controller through the Ethernet, to acquire relevant control information of the controller;
a Graphical User Interface (GUI) interface connected with a first Personal computer (PC), wherein the first PC is configured to send a user instruction to the controller through the GUI interface, so that the controller performs a corresponding control operation according to the user instruction; and
a serial communication interface connected with a second PC, wherein the second PC is configured to upgrade firmware of the controller through the serial communication interface.

11. The power distribution unit according to claim 1, wherein the star-connected switching circuit and the delta-connected switching circuit are not turned on at the same time.

12. The power distribution unit according to claim 1, wherein three phase windings on a primary side of the distribution transformer are connected in a star connection mode.

13. The power distribution unit according to claim 5, wherein each of the sub-detection circuits further comprises: a resistor R1 and a transient voltage suppressor (TVS) that are connected in parallel with the voltage sensing element; and resistors R2, R3, R4 and R5 disposed at input terminals of the first differential amplifier and the second differential amplifier, wherein the resistor R1 is used for matching the input impedance; the TVS is used for lightning protection; the resistors R2, R3, R4 and R5 are used for current limiting.

14. The power distribution unit according to claim 4, wherein each of the switches in the star-connected switching circuit, the delta-connected switching circuit and the protection switching circuit is one of: a relay, an electromagnetic contact switch and an Insulated Gate Bipolar Transistor (IGBT) switch.

15. The power distribution unit according to claim 14, wherein the controller is further configured to control an IGBT driving circuit to generate six pulse width modulation (PWM) signals, and the six PWM signals are respectively provided to sixth IGBT switches to drive the six IGBT switches to be turned on.

16. The power distribution unit according to claim 15, wherein the voltage and current detection circuit is further configured to detect the voltage signal or current signal input by each of the three phase windings on the secondary side of the distribution transformer and feed a detected voltage signal or current signal back to the controller, and the controller is further configured to adjust the PWM signal generated by the IGBT driving circuit according to the voltage signal or the current signal fed back.

17. The power distribution unit according to claim 5, wherein the star-connected switching circuit comprises a first star switch, a second star switch, a third star switch, a fourth star switch, a fifth star switch and a sixth star switch; wherein a first terminal of the first star switch is connected with a first terminal of the a-phase winding, a first terminal of the second star switch is connected with a first terminal of the b-phase winding, a first terminal of the third star switch is connected with a first terminal of the c-phase winding, a first terminal of the fourth star switch is connected with a neutral wire terminal of the a-phase socket, a first terminal of the fifth star switch is connected with the neutral wire terminal of the b-phase socket, a first terminal of the sixth star switch is connected with the neutral wire terminal of the c-phase socket, second terminals of the first star switch to the sixth star switch are connected, and control terminals of the first star switch to the sixth star switch are all connected with the controller, and earth wire terminals of the a-phase socket, the b-phase socket and the c-phase socket are all grounded;
wherein the controller is further configured to: enable the first star switch to the sixth star switch to be turned on; control switches in the delta-connected switching circuit to be in an open circuit state; and enable the a-phase protection switch, the b-phase protection switch and the c-phase protection switch to be turned on.

18. The power distribution unit according to claim 17, wherein the controller is configured to enable the first star switch to the sixth star switch to be turned on; control switches in the delta-connected switching circuit to be in an open circuit state; control the a-phase protection switch to be turned off for protection, and enable the b-phase protection switch and the c-phase protection switch to be turned on.

19. The power distribution unit according to claim 17, wherein the controller is configured to enable the first star switch to the sixth star switch to be turned on; control switches in the delta-connected switching circuit to be in an open circuit state; control the c-phase protection switch to be turned off for protection, and enable the a-phase protection switch and the b-phase protection switch to be turned on.

20. The power distribution unit according to claim 5, wherein the delta-connected switching circuit comprises a first delta switch, a second delta switch, a third delta switch, a fourth delta switch, a fifth delta switch and a sixth delta switch; wherein a first terminal of the first delta switch is connected with a second terminal of the a-phase winding, the first terminal of a-phase protection switch and a first terminal of the sixth delta switch, respectively, a second terminal of the first delta switch is connected with a first terminal of the b-phase winding, a first terminal of the second delta switch is connected with a second terminal of the b-phase winding, the first terminal of b-phase protection switch and a first terminal of the fourth delta switch, respectively, a second terminal of the second delta switch is connected with a first terminal of the c-phase winding, a first terminal of the third delta switch is connected with a second terminal of the c-phase winding, the first terminal of c-phase protection switch and a first terminal of the fifth delta switch, respectively, a second terminal of the third delta switch is connected with a first terminal of the a-phase winding, a second terminal of the fourth delta switch is connected with a neutral wire terminal of the a-phase socket, a second terminal of the fifth delta switch is connected with the neutral wire terminal of the b-phase socket, a second terminal of the sixth delta switch is connected with the neutral wire terminal of the c-phase socket, and earth wire terminals of the a-phase socket, the b-phase socket and the c-phase socket are all grounded;

the controller is further configured to enable the first delta switch to the sixth delta switch to be turned on; control switches in the star-connected switching circuit to be in an open circuit state; and enable the a-phase protection switch, the b-phase protection switch and the c-phase protection switch to be turned on.

* * * * *